US006941622B1

(12) United States Patent
Hung

(10) Patent No.: US 6,941,622 B1
(45) Date of Patent: Sep. 13, 2005

(54) HOOK CAPABLE OF HOOKING CHAIN AT DESIRED LENGTH

(76) Inventor: Rung Te Hung, 235 Chung-Ho Box 8-24, Taipei (TW)

( * ) Notice: Subject to any disclaimer, the term of this patent is extended or adjusted under 35 U.S.C. 154(b) by 0 days.

(21) Appl. No.: 10/421,163

(22) Filed: Apr. 21, 2003

(51) Int. Cl.[7] .......................... A44B 11/00; A44B 13/00; B66C 1/00; F16G 15/04

(52) U.S. Cl. ........................ 24/599.1; 24/370; 24/595.1; 24/596.1; 24/592.1; 24/599.6; 24/599.7; 24/318; 59/85

(58) Field of Search ............................ 24/599.1, 592.1, 24/595.1, 596.1, 599.6, 599.7, 318, 321, 370; 59/85; 152/219, 239, 241, 245; 135/115

(56) References Cited

U.S. PATENT DOCUMENTS

| | | | | | |
|---|---|---|---|---|---|
| 499,304 | A | * | 6/1893 | Minshall | 24/599.6 |
| 760,171 | A | * | 5/1904 | Atwell | 24/599.6 |
| 1,347,725 | A | * | 7/1920 | Weiss | 59/85 |
| 1,709,235 | A | * | 4/1929 | Shaffer | 24/599.7 |
| 5,832,571 | A | * | 11/1998 | Kanamori | 24/599.6 |
| 5,906,032 | A | * | 5/1999 | Fredriksson | 24/370 |
| 6,308,385 | B1 | * | 10/2001 | Ball | 24/599.1 |
| 6,421,888 | B1 | * | 7/2002 | Grenga et al. | 24/599.6 |

* cited by examiner

*Primary Examiner*—Victor Sakran

(57) ABSTRACT

A hook is capable of hooking a chain at a desired length. The hook comprises a hook body, and a buckle above the hook body. The buckle has a U shape opening. Width of the shape opening is confined by the size of a chain to be hung. The buckle, has a penetrating groove which penetrates two inner sides of the buckle and one outer side of the buckle. A spring and a movable shaft pass through the penetrating groove. The movable shaft is positioned by a pin so that the spring is compressed by the movable shaft and the movable shaft will not drop out of the buckle. A notch is formed at a predetermined portion of the movable shaft. A semi-round groove is formed at a coupling portion of the buckle and the notch, and the semi-round groove is positioned across the two inner sides of the buckle.

2 Claims, 5 Drawing Sheets

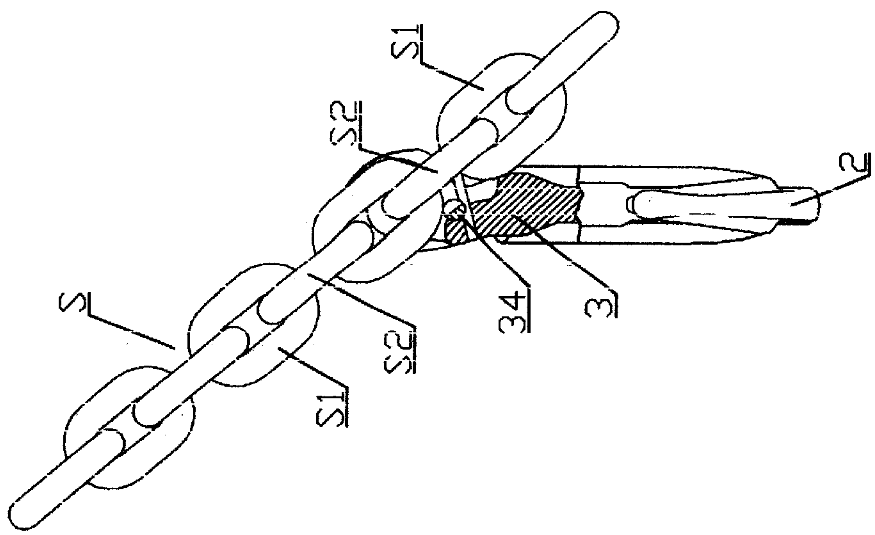
Fig. 3-B
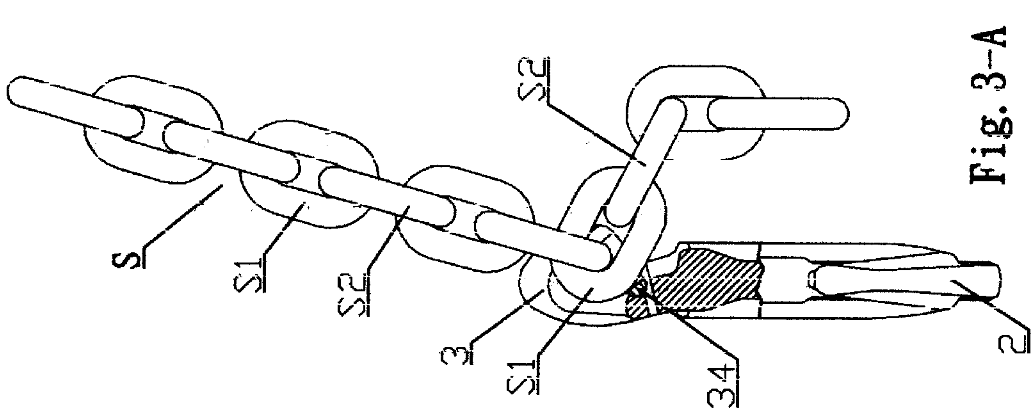
Fig. 3-A

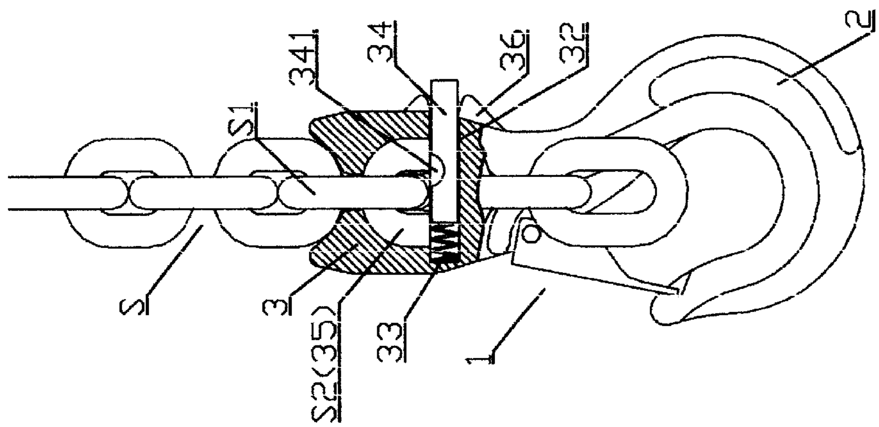
Fig. 4-B
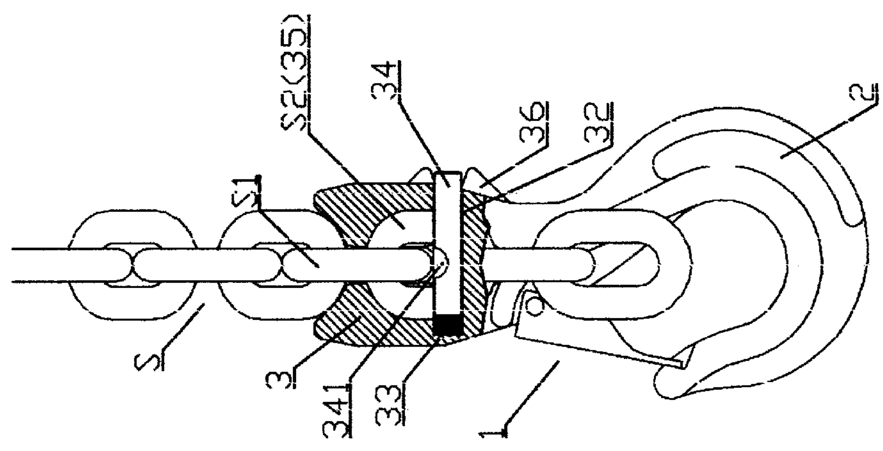
Fig. 4-A

HOOK CAPABLE OF HOOKING CHAIN AT DESIRED LENGTH

FIELD OF THE INVNETION

The present invention related to hooks, and particularly to a hook capable of hooking a chain at a desired length with an easy operation.

BACKGROUND OF THE INVENTION

A hook serves to hook a chain by connecting the distal end of the chain. Thereby, the hook can hang a heavy object by extending a chain. Conventionally, a movable U shape hook or a bi-directional hook is added to hook a selective portion of a chain. A rear hook opening of the U shape hook or the bi-directional hook is used to hook one end of the chain. However other than preparing the U shape hook or the bi-directional hook in advance, the U shape hook or the bi-directional hook will vibrate so that it is unstable and dangerous.

SUMMARY OF THE INVENTION

Accordingly, the primary object of the present invention is to provide a hook capable of hooking a chain at a desired length. The hook comprises a hook body, and a buckle above the hook body. The buckle has a U shape opening. Width of the shape opening is confined by the size of a chain to be hung. The buckle has a penetrating groove which penetrates two inner sides of the buckle and one outer side of the buckle. A spring and a movable shaft pass through the penetrating groove. The movable shaft is positioned by a pin so that the spring is compressed by the movable shaft and the movable shaft will not drop out of the buckle. A notch is formed at a predetermined portion of the movable shaft. A semi-round groove is formed at a coupling portion of the buckle and the notch, and the semi-round groove is positioned across the two inner sides of the buckle.

The various objects and advantages of the present invention will be more readily understood from the following detailed description when read in conjunction with the appended drawing.

BRIEF DESCRIPTION OF THE DRAWINGS

FIG. 3A shows a lateral view before a chain is buckled into the hook off the present invention.

FIG. 3B shows a lateral view after a chain is buckled into the hook of the present invention.

FIG. 4A shows a front view before a chain is buckled into the hook of the present invention.

FIG. 4B shows a front view after a chain is buckled into the hook of the present invention.

BRIEF DESCRIPTION OF THE PREFERRED EMBODIMENTS

Figure 1:
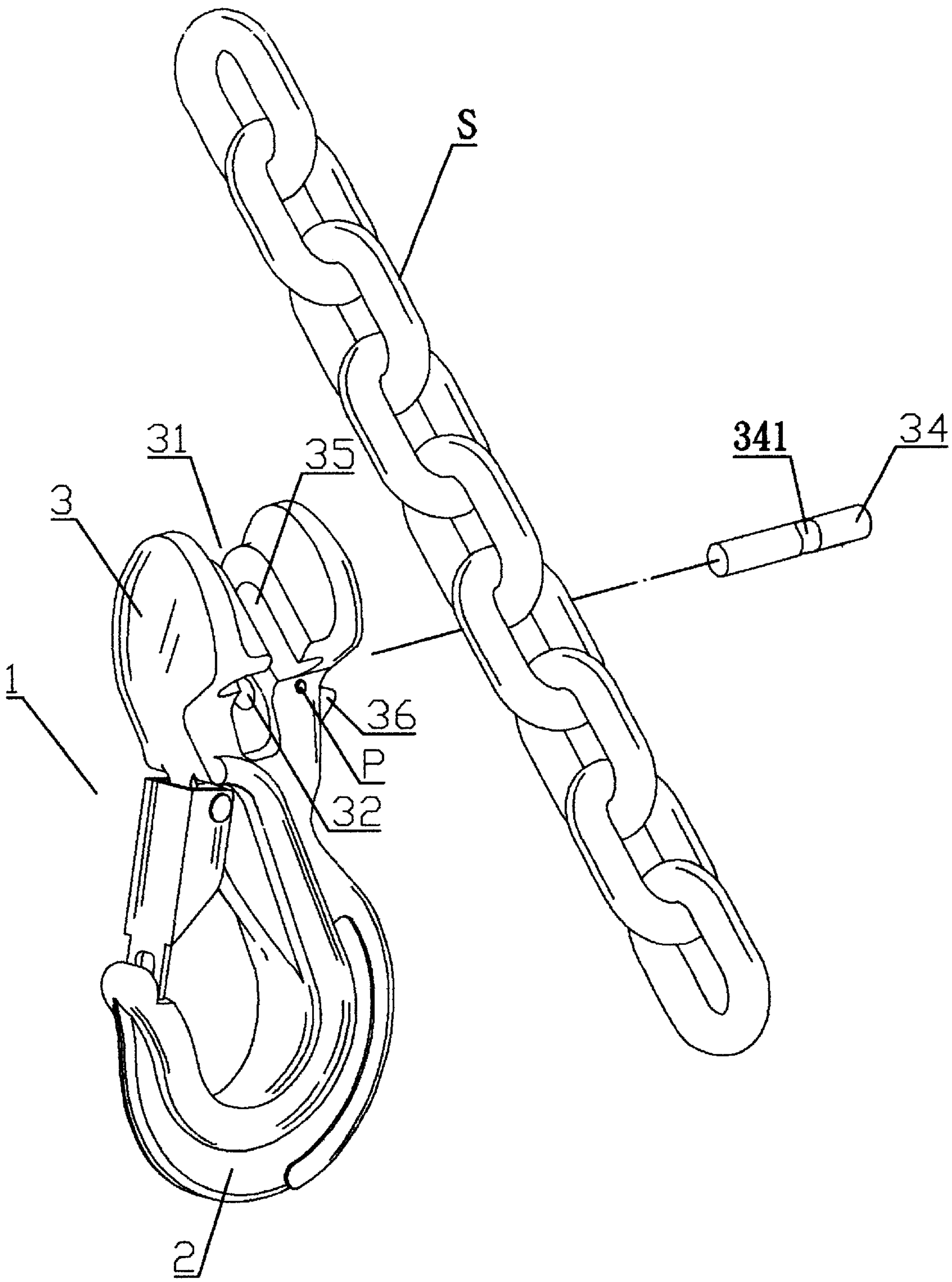
FIG. 1 is an exploded perspective view of the present invention.
Figure 2:
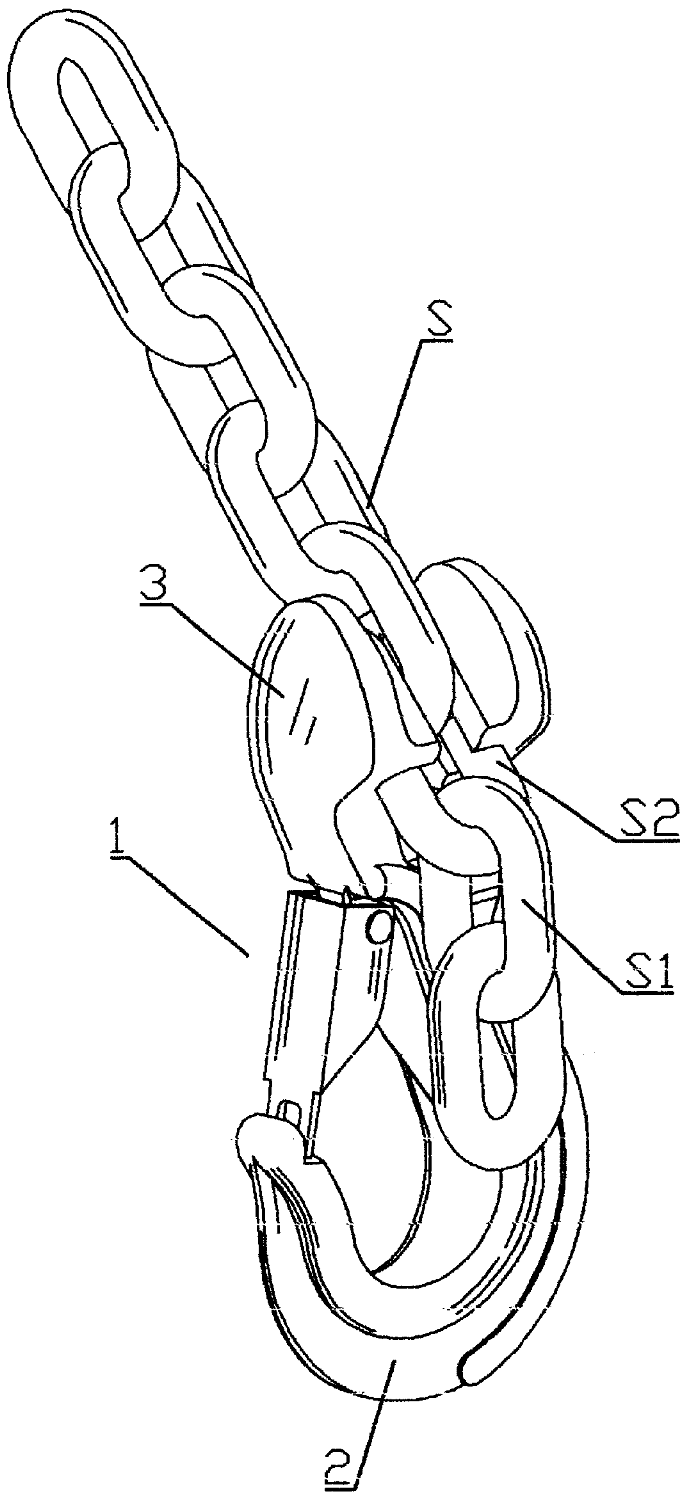
FIG. 2 is an assembled perspective view of the present invention.

Referring to FIGS. 1 and 2, the structure of the present invention is illustrated. The present invention is formed by a hook body 2 and a buckle 3 above the hook body 2.

The buckle 3 has a U shape opening 31. A width of the U shape opening 31 is confined by the size of the chain to be suspended from the hook. The buckle 3 has a penetrating groove 32 which penetrating two inner sides of the buckle 3 and one outer side of the buckle 3.

Referring to FIG. 4-A and FIG. 4-B, a spring 33 and a movable shaft 34 passes through the penetrating groove 32. The spring 33 is positioned at an inner side. The movable shaft 34 is positioned by a pin P (see FIG. 1) so that the spring 33 and the movable shaft 34 will not drop out of the buckle 3. A notch 341 is formed at a predetermined portion of the movable shaft 34.

A semi-round groove 35 is formed at a coupling portion of the buckle 3 and the notch 341 and the semi-round groove 35 runs across the two inner sides of the buckle 3.

The assembly of the present invention will be described herein with reference to FIGS. 3 and 4.

In assembly, the spring 33 and the movable shaft 34 are inserted into the penetrating groove 32 from an opening of the penetrating groove 32 at the outer side of the buckle 3. The spring 33 is positioned at a non-penetrating side. Firstly, the notch 341 is exposed out from the buckle 3 (referring to FIG. 3A). Then, as shown in FIG. 3A, the ring S1 is placed into the inner sides of the U shape buckle 3 with one end of the ring S1 exactly passes through the notch 341 (referring to FIG. 4A) so 0that the ring S1 can be positioned in the inner side of the U shape notch. Then the ring S2 is driven into the semi-round groove 35 and the ring S2 exactly resists against a top surface of the semi-round groove 35. Referring to FIGS. 3B and 4B, then, the movable shaft 34 is released to move out by the resilient force of the spring 33 and thus the ring S1 will release out from the notch 341. As a result, the ring S1 resists against the movable shaft 34 instead of the notch 341 (referring to FIGS. 3B and 4B). Finally, the pin P is inserted into the buckle 3 and the movable shaft 34 so as to prevent the chain from releasing out. Thereby, the chain S is positioned.

Figure 5:
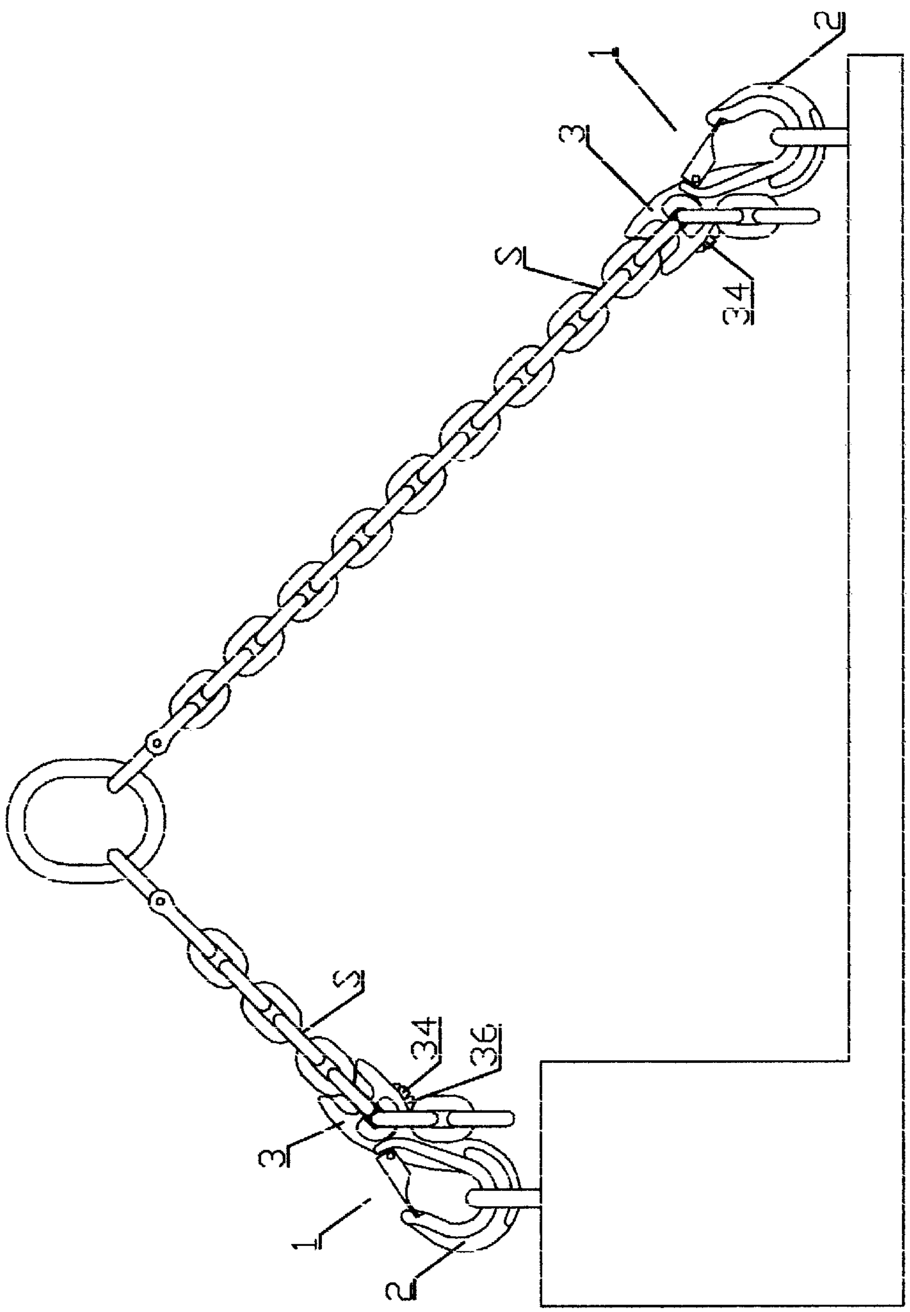
FIG. 5 shows one embodiment of the present invention wherein the hooks of the present invention is hooked two ends of a chain.

Referring to FIG. 5, one application of the present invention is illustrated, wherein two ends of a chain S are fixed to a retainer. The chain S is adjusted to have a desired length. Thereby, by the present invention, the chain is adjustable to match a hanging object and moreover, the chain will not released out.

The buckle is formed with a protecting edge to protecting the movable shaft from dropping out.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A hook capable of hooking a chain at a desired length comprising a hook body, and a buckle above the hook body;

the buckle having a U shape opening; width of the U shape opening being confined by the size of a chain to be hung thereon; the buckle having a penetrating groove which penetrates two inner sides of the buckle, one outer side of the buckle and the penetrating groove is formed with a groove opening at the outer side;

a spring and a movable shaft passing through the penetrating groove; the movable shaft being positioned by a pin so that the spring is compressed by the movable shaft and the movable shaft will not drop out of the buckle; a notch being formed at a predetermined portion of the movable shaft;

a semi-round groove being formed at a coupling portion of the buckle and the notch, and the semi-round groove being positioned across the two inner sides of the buckle;

wherein in assembly, the spring and the movable shaft are inserted into the penetrating groove from the groove opening of the penetrating groove at the outer side of the buckle; the spring is positioned at a non-penetrating side; the notch is exposed out from the buckle; then, a ring of a chain is placed into the inner sides of the U shape buckle with one end of the first ring exactly passes through the notch so, that the first ring is positioned in the inner side; of the shape notch; then the ring is driven into the semi-round groove and a second ring exactly resists against a top surface of the semi-round groove; then the movable shaft is released so as to move out by the resilient force of the spring and thus the ring will release out from the notch; as a result, the ring resists against the movable shaft instead of the notch; finally, the pin is inserted into the buckle and the movable shaft so as to prevent the chain from releasing out; thereby, the chain S is positioned.

2. The hook capable of hooking a chain at a desired length as claimed in claim 1, wherein the buckle is formed with a protecting edge to protecting the movable shaft from dropping out.

* * * * *